US007493445B2

(12) United States Patent
Harada (10) Patent No.: US 7,493,445 B2
(45) Date of Patent: Feb. 17, 2009

(54) CACHE MEMORY SYSTEM AND CONTROL METHOD OF THE CACHE MEMORY SYSTEM (75) Inventor: Nobuyuki Harada, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 11/162,509

(22) Filed: Sep. 13, 2005

(65) Prior Publication Data
US 2006/0059309 A1 Mar. 16, 2006

(30) Foreign Application Priority Data
Sep. 13, 2004 (JP) ............................. 2004-265431

(51) Int. Cl.
G06F 12/00 (2006.01)
(52) U.S. Cl. ........................ 711/118; 711/133; 711/141
(58) Field of Classification Search .................. 711/118
See application file for complete search history.

(56) References Cited

U.S. PATENT DOCUMENTS 4,315,312 A * 2/1982 Schmidt ...................... 711/172
5,588,129 A * 12/1996 Ballard ........................ 711/113
5,802,572 A * 9/1998 Patel et al. ................... 711/143

FOREIGN PATENT DOCUMENTS

JP 2002251322 9/2006

* cited by examiner

Primary Examiner—Hyung S Sough
Assistant Examiner—Mardochee Chery
(74) Attorney, Agent, or Firm—Michael LeStrange

(57) ABSTRACT

To improve the efficiency of access to a system memory associated with changes (writes) to cache data, a cache line having the same memory size as write data is selected and the write data is written into the selected cache line, thereby reducing the number of accesses to the system memory to cache data from the system memory associated with partial replacement of cache lines. Further, valid data at an address contiguous with the address of the write data is combined with the write data, and written into a cache line having the same size as the combined data, thereby reducing the number of accesses to the system memory to flush data from the cache associated with writes to the cache.

15 Claims, 7 Drawing Sheets

CACHE MEMORY SYSTEM AND CONTROL METHOD OF THE CACHE MEMORY SYSTEM

FIELD OF THE INVENTION

The present invention relates generally to a cache memory system and its control method, and particularly to an improvement in the speed and efficiency of a write access to a cache memory.

BACKGROUND OF THE INVENTION

In a computer system such as a personal computer (PC), a central processing unit (CPU) processes massive amounts of data while accessing memory storing the data. A system memory such as of dynamic random access memory (DRAM) has a large storage capacity, but its access speed is low. In order to increase the speed of access to frequently used data, the computer system uses a cache memory (hereafter simply called "cache") such as of static random access memory (SRAM) to be accessed by the CPU. The cache is much smaller in storage capacity but higher in access speed than the system memory like DRAM.

A cache memory has cache lines that consist of units of words of a predetermined length. A cache memory system consists of a plurality of cache lines. In the existing cache system, the line size of each cache is fixed, for example, 16 or 32 bytes. Reading (caching in) from a system memory or writing (caching out, flushing) to the system memory is performed on a line (byte) basis.

In order to maintain data coherency with the system memory, the cache system is required to cache or flush data on a line basis each time a change (write) is made to the cache line. For example, if write data from the CPU is smaller in size than the cache line, that is, if part of the cache line has to be rewritten or replaced, it will be necessary to read a complete line of data from the system memory so as to maintain the coherency of the un-replaced part of data in the cache line.

If the speed of access to the system memory is slower than the CPU and cache operating speeds, then a stall of the CPU may result. If access to the system memory occurs frequently, the data processing speed of the CPU will be reduced. Especially when processing massive amounts of data, such as color image data, the influence of a slowdown of the processing speed becomes too strong to ignore. Therefore, reducing the frequency of access to the system memory (caching or cache flushing) associated with changes (writes) to the cache can prevent the data processing speed of the CPU from slowing down.

A technique for improving the efficiency of memory access and hence processor performance is disclosed, for example, in Japanese patent application laid-open No H11-65925 (65925/1999),incorporated herein by reference. This publication, however, does not disclose a technique for reducing the number of access operations to a system memory associated with changes (writes) to the cache.

SUMMARY OF THE INVENTION

It is an object of the present invention to improve the efficiency of access to a system memory associated with changes (writes) to cache data.

It is another object of the present invention to reduce the frequency of caching associated with changes (writes) to cache data while maintaining data coherency.

It is still another object of the present invention to reduce the frequency of cache flushing associated with changes (writes) to cache data.

The present invention provides a cache memory having a plurality of cache lines of different length, in which a cache line having the same memory size as write data is selected, so that the write data is written into the cache line selected.

In the present invention, valid data at an address contiguous with the address of the write data is combined with the write data, and the combined data is written into a cache line having the same size as the combined data.

According to the present invention, a cache line having the same memory size as write data is selected, so that the write data is written into the cache line selected, thereby reducing the number of accesses to cache data from the system memory associated with partial replacement of cache lines.

Also, according to the present invention, valid data at an address contiguous with the address of the write data is combined with the write data, and the combined data is written into a cache line having the same size as the combined data, thereby reducing the number of accesses to a system memory to flush cache lines associated with writes to the cache lines.

Thus, according to the present invention, the number of accesses to the system memory for caching and/or flushing of data in accordance with write instructions from the CPU can be reduced, thereby improving the overall data processing speed of the CPU.

The novel features believed to be characteristic of this invention are set forth in the appended claims. The invention itself, however, as well as other objects and advantages thereof, may be best understood by reference to the following detailed description of an illustrated preferred embodiment to be read in conjunction with the accompanying drawings.

DETAILED DESCRIPTION OF THE PREFERRED EMBODIMENTS

In the following detailed description of embodiments, reference is made to the accompanying drawings which form a part hereof, and in which are shown by way of illustration specific embodiments that are described in sufficient detail to enable those skilled in the art to practice the invention, and it is to be understood that other embodiments may be utilized and logical, structural, electrical and other changes may be made without departing from the scope of the present invention.

The present invention will now be described with reference to the accompanying drawings. FIGS. 1 to 6 are schematics for explaining a method (operation) of the present invention. The schematics of FIGS. 1 to 6 assume a cache memory system having cache word lines with a maximum length of 8 bytes (1, 2, 4, and 8 bytes) and each of which uses a 16-bit CPU address space having a data width of 8 bytes at the maximum. When a write is made from the CPU to the cache, a write-back operation is performed. All addresses and data to be described below are represented in hexadecimal notation.

Figure 1:
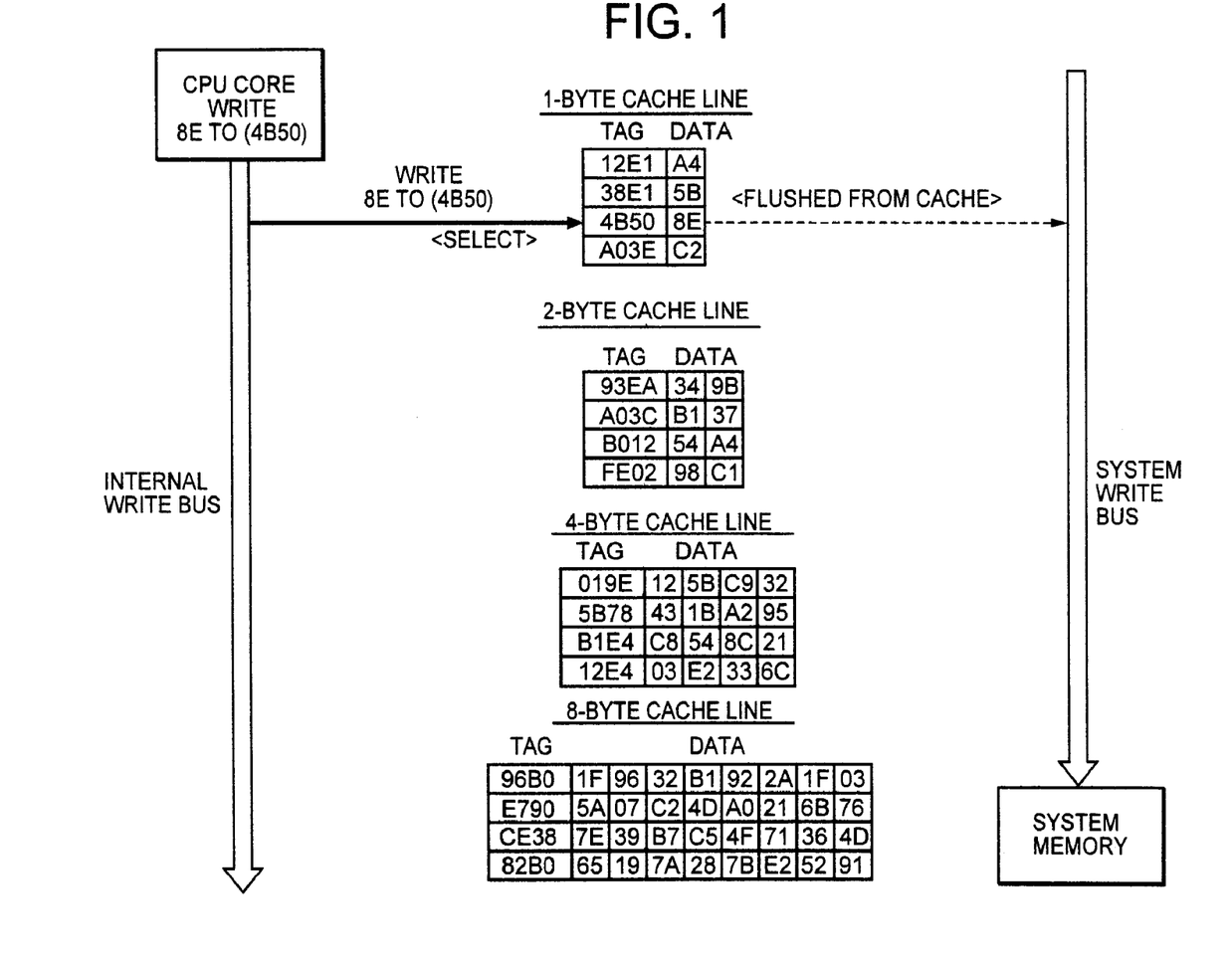
FIG. 1 is a schematic block diagram illustrating a single byte write operation to a cache memory according to a preferred embodiment.

FIG. 1 shows a case where a CPU core writes 1-byte data "8E" to address "4B50". A 1-byte cache line having the same size as the write data is selected, so that the write data is written into the selected cache line as data "8E" to address "4B50". In this case, if valid data is present in a 1-byte cache line containing the address that is identical to the address "4B50", the valid data is replaced by the write data "8E". Upon replacement, if all the 1-byte cache lines are full, a cache line is specified using a predetermined cache updating procedure such as conventional LRU (Least Recently Used) algorithm. Then, the specified cache line is flushed if needed to write the data back to the system memory (such as DRAM) to maintain data coherency.

The address of the 1-byte write data matches the higher-order 15 bits of an address in a 2-byte cache line, the higher-order 14 bits of an address in a 4-byte cache line, or the higher-order 13 bits of an address in an 8-byte cache line. In these cases, if valid data is present in the corresponding cache line, then 1-byte of data in the cache line containing the matched address is replaced by the 1-byte write data. In the example of FIG. 1, since no matched address is found in cache lines of 2 or more bytes, that is, there is no valid data to be replaced in the cache lines, the write data is written into the 1-byte cache line alone.

Figure 2:
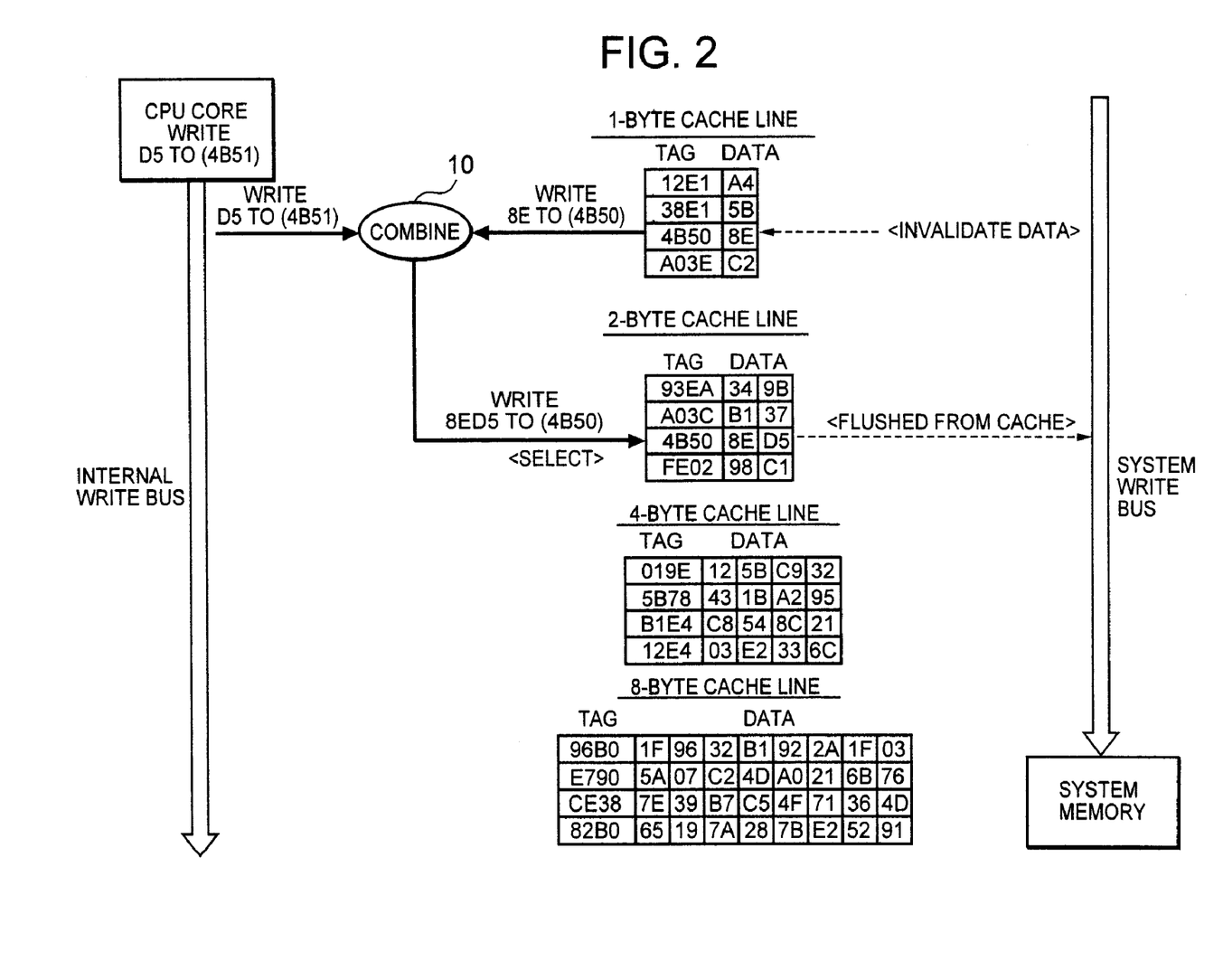
FIG. 2 is a schematic block diagram illustrating the method of combining a single byte to be written to the cache and a previously stored valid byte in a 2-byte cache line according to the preferred embodiment.

FIG. 2 shows a case where the CPU core writes 1-byte data "D5" to address "4B51". In this case, there is valid data "8E" in the 1-byte cache line containing address "4B50" the higher-order 15 bits of which match those of address "4B51" (that is, which is contiguous with address "4B51"). The valid data "8E" at the address "4B50" is combined with data "D5" at the address "4B51" (as indicated by reference numeral 10). The combined 2-byte data is written into a 2-byte cache line as 2-byte data starting at the address "4B50". If all the 2-byte cache lines are full, a certain cache line is flushed or purged using the predetermined cache updating procedure in the same manner as in the case of FIG. 1. Then the data "8E" in the 1-byte cache line is made invalid so that data to the same address will not be present in different cache lines.

Figure 3:
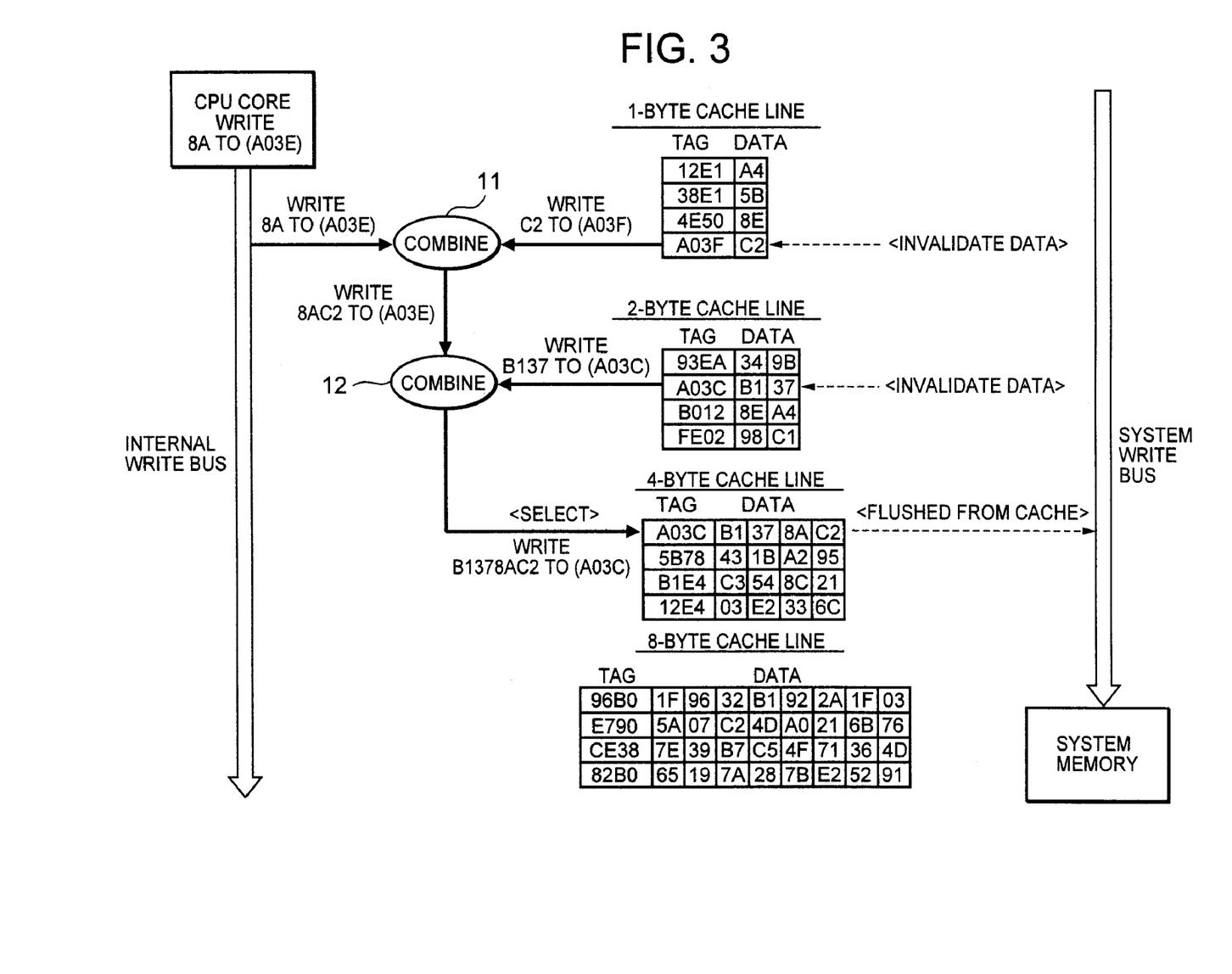
FIG. 3 is a schematic block diagram illustrating the method of combining a single byte to be written to the cache with three bytes of previously stored data in a contiguous memory address space according to the preferred embodiment.

FIG. 3 shows a case where the CPU core writes 1-byte data "8A" to address "A03E". In this case, there is valid data "C2" in a 1-byte cache line containing address "A03F" the higher-order 15 bits of which match those of address "A03E". The valid data "C2" at the address "A03F" is combined with data "8A" to the address "A03E" (as indicated by reference numeral 11). Further, there is a 2-byte cache line that holds valid data "B137" starting at address "A03C" the higher-order 14 bits of which match those of the address "A03E". Therefore, the data "B137" is combined with data "8AC2" starting at the address "A03E" (as indicated by reference numeral 12). The combined 4-byte data "B1378AC2" is written into a 4-byte cache line as data starting at the address "A03C".

If all the 4-byte cache lines are full, a certain cache line is flushed or purged using the predetermined cache updating procedure in the same manner as in the case of FIG. 1. Then, the data "C2" in the 1-byte cache line and the data "B137" in the 2-byte cache line are made invalid so that data to the same address will not be present in different cache lines. Note that the same operation flow as that in FIG. 3 can also be carried out on 8b-byte cache lines, that is, the same sequence of operations are repeated until all write data are written to the cache.

Figure 4:
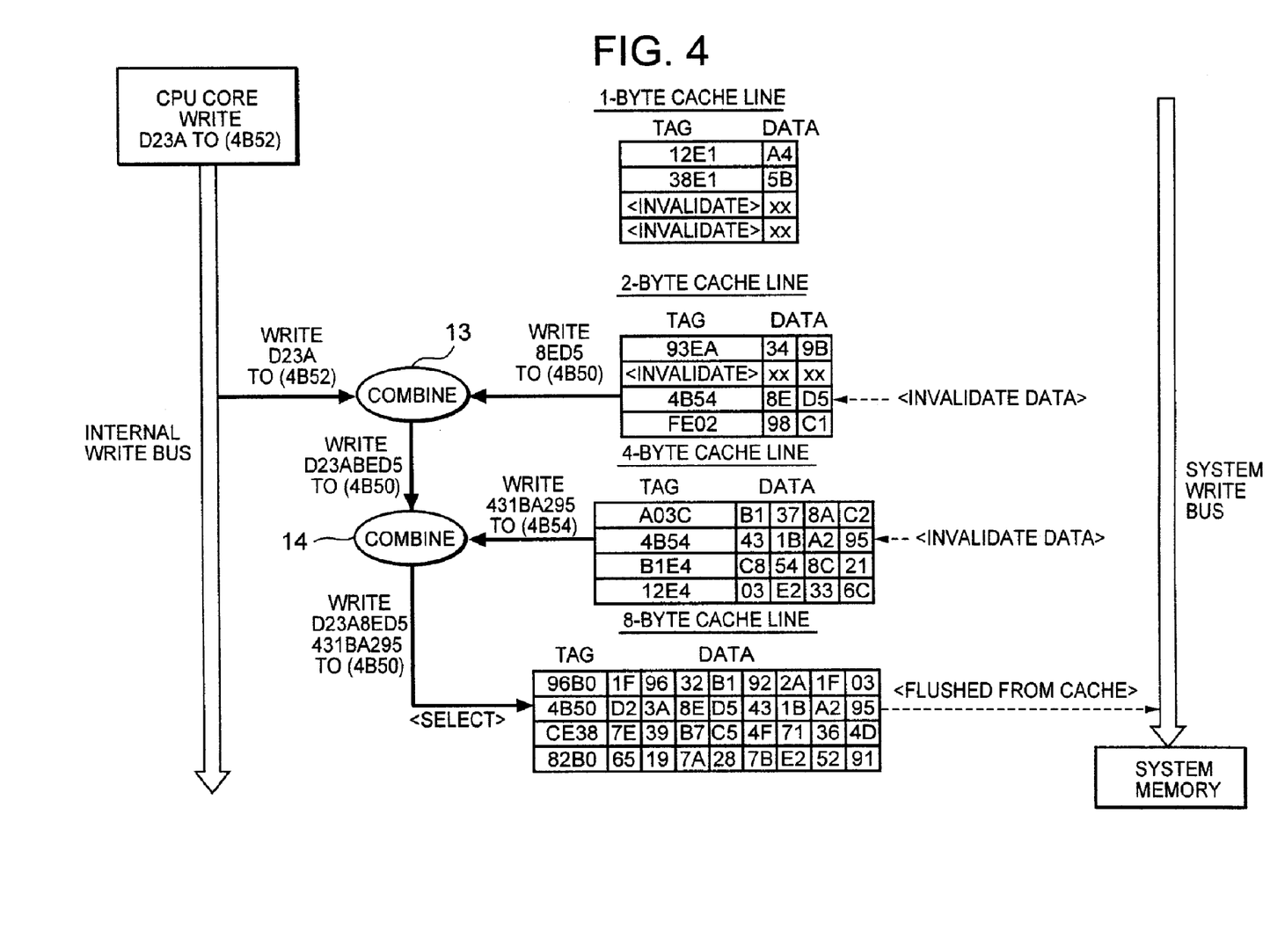
FIG. 4 is a schematic block diagram illustrating the method of combining two bytes of data to be written to the cache with six bytes of previously stored data within an 8-byte cache line according to the preferred embodiment.

FIG. 4 shows a case where the CPU core writes 2-byte data "D23A" to address "4B52". In FIG. 4, 8-byte data obtained through two data combining steps (13, 14) is written into an 8-byte cache line as a string of data starting at address "4B50". The operation flow is the same as that in FIG. 3 except for the number of written bytes, and the detailed description is omitted.

Figure 5:
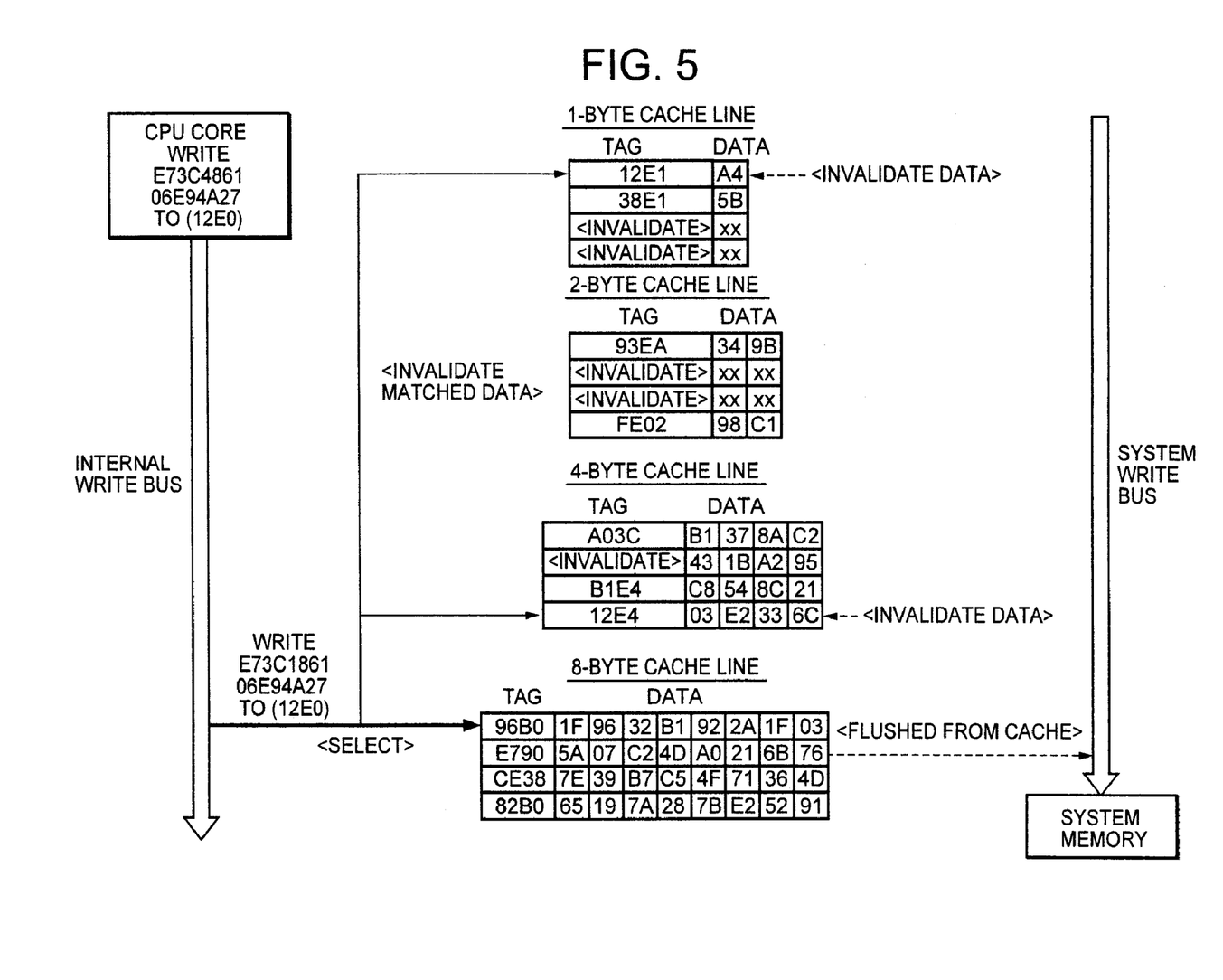
FIG. 5 is a schematic block diagram illustrating the method of invalidating a 1-byte and 4-byte cache line by writing a 8-byte data word according to the preferred embodiment.

FIG. 5 shows a case where the CPU core writes 8-byte data word "E7 . . . 27" starting at address "12E0". An 8-byte cache line is selected and the 8-byte data is written. If all the 8-byte cache lines are full, a certain cache line is flushed or purged using the predetermined cache updating procedure in the same manner as in the case of FIG. 1. Data in 1-byte and 4-byte cache lines containing matched addresses are made invalid so that data to the same address will not be present in different cache lines. In FIG. 5, 1-byte line data "A4" at address "12E1" and 4-byte line data "03 . . . 6C" at address "12E4" are made invalid.

Figure 6:
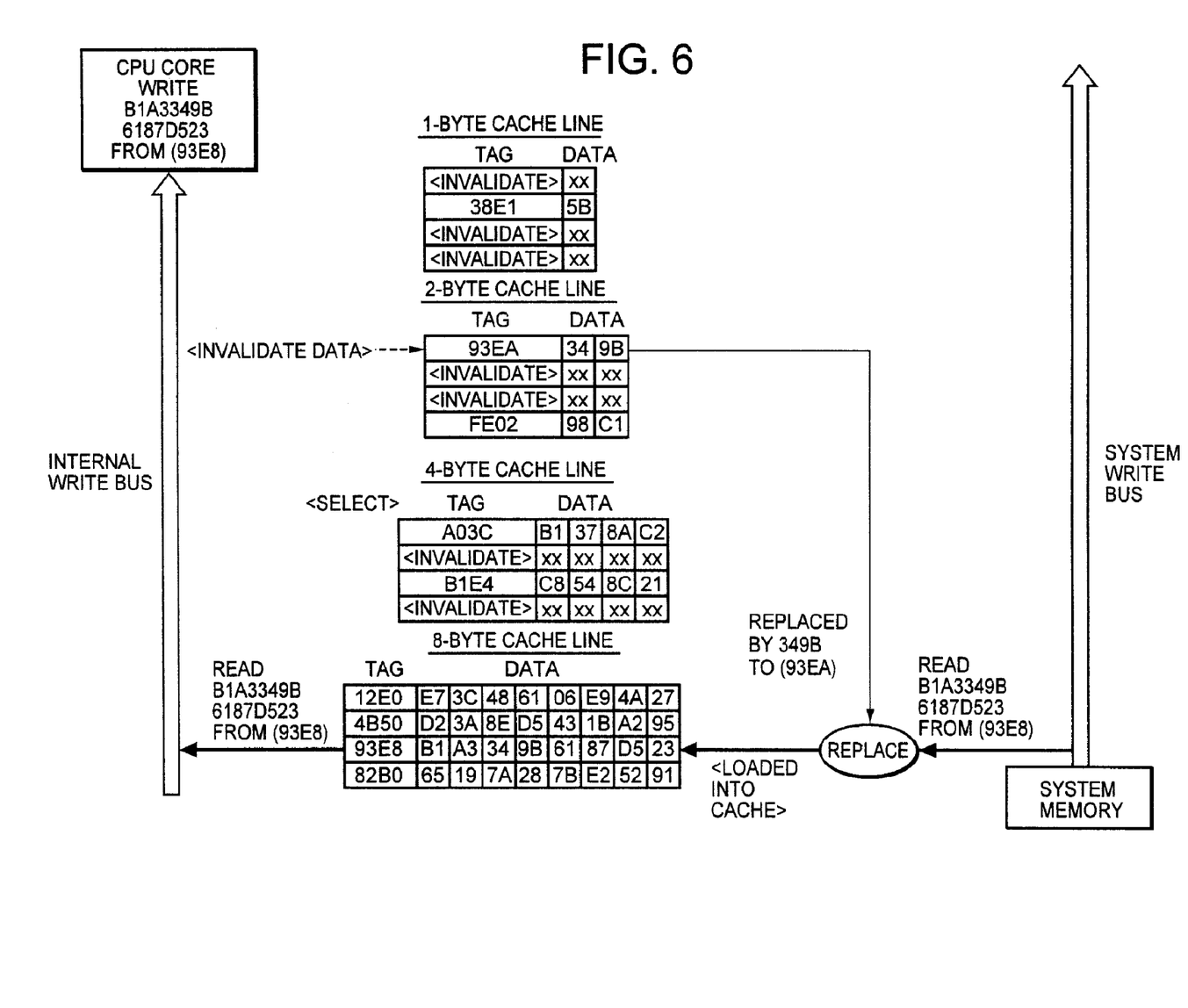
FIG. 6 is a schematic block diagram illustrating the method of replacing data at a matched address of a 2-byte cache line according to the preferred embodiment.

FIG. 6 shows a case where the CPU core reads an 8-byte data word starting at address "93E8". In this case, if there is valid data in an 8-byte cache line containing address that is identical to address "93E8", the data is read out as it is. In FIG. 6, since there is no identical address, that is, there is no data to the address, the cache reads from the system memory 8-byte data starting at the address "93E8". If any of the 1-byte through 4-byte cache lines holds data at an identical or matched address, a corresponding byte(s) of data from the system memory will be replaced by the data at the matched address. In FIG. 6, since there is data "349B" at matched address "93EA" of a 2-byte cache line, corresponding bytes of data are replaced by the data. The 2-byte cache line data "349B" used for replacement is made invalid so that data to the same address will not be present in different cache lines. The partially replaced 8-byte data is written into an 8-byte cache line and sent to the CPU core.

Figure 7:
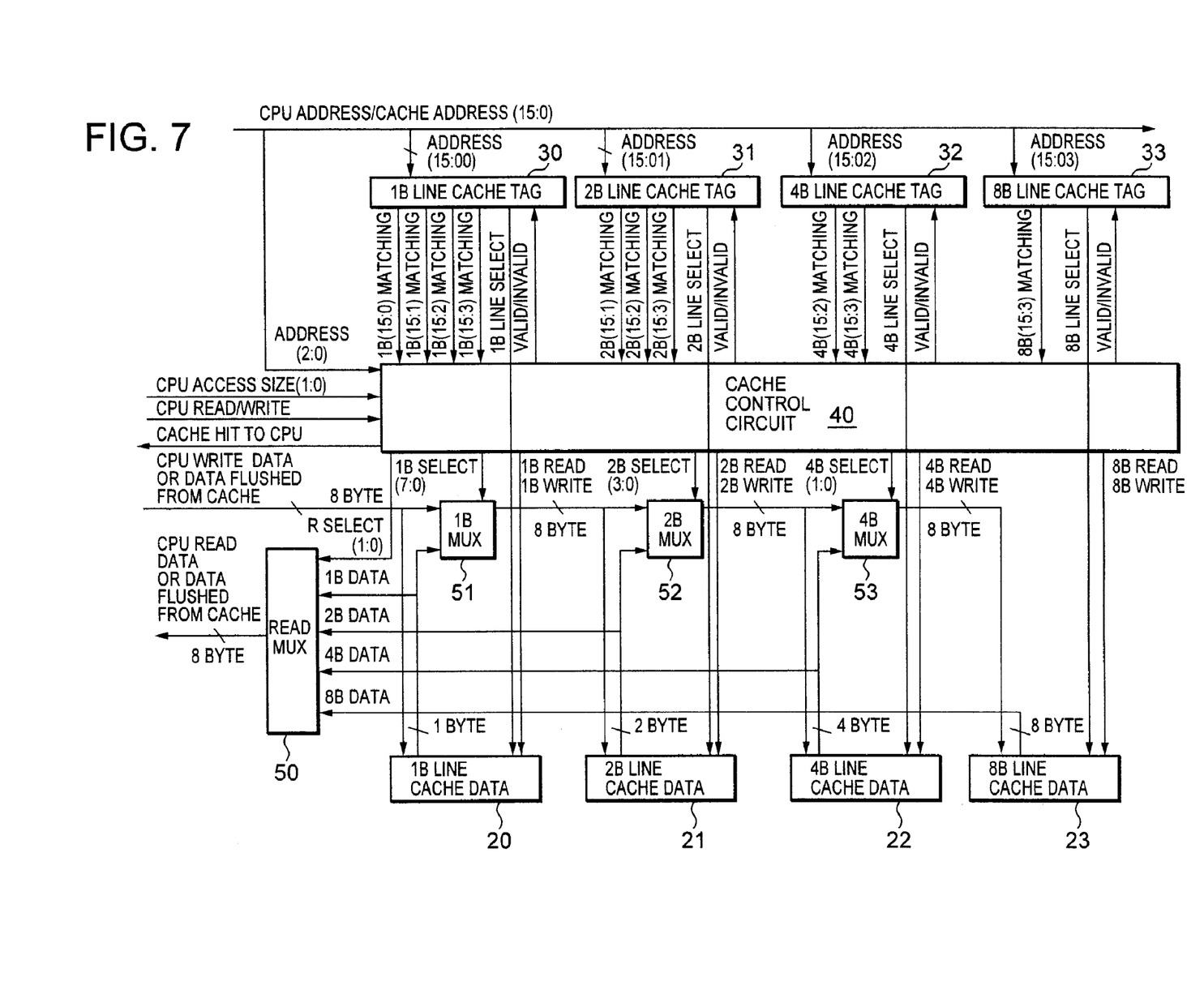
FIG. 7 is a schematic block diagram illustrating an example of the structure of a cache memory system according to the preferred embodiment.

FIG. 7 is a block diagram showing an example of the structure of a cache system for implementing the method according to the present invention as described in FIGS. 1 to 6. The system of FIG. 7 includes 1-byte to 8-byte cache lines 20 to 23, tag circuits 30-33, a cache control circuit 40, and data combining circuits 50-53. The cache lines 20-23 hold data. The tag circuits 30-33 compare the address of write data with cache line addresses. The tag circuits 30-33 are provided for the cache lines 20-23, respectively. The cache control circuit 40 performs various control functions related to the cache lines in accordance with instructions from the CPU (write, read, etc) based on the address comparison results from the tag circuits. Each operation flow illustrated in FIGS. 1 to 6 is executed by the cache control circuit 40. The combining circuits 50-53 are multiplexers (MUXs) that combine byte data (signals) as shown in FIGS. 1 to 6.

The following describes the operation of the system of FIG. 7 by taking the cases of FIGS. 3 and 6 as examples. The operation is the same as in the cases of the other figures.

Referring again to FIG. 3, the CPU core sends an instruction to control circuit 40 to write 1-byte data "8A" to address "A03E". Tag circuits 30-33 respectively for 1-byte, 2-byte, 4-byte and 8-byte cache lines compare addresses. Cache control circuit 40 receives address comparison results from tag circuits 30-33. If there is valid data at the address "A03F" the higher-order 15 bits of which match those of address "A03E", tag circuit 30 sends a "1B (15:0) matching" signal to control circuit 40. Similarly, tag circuits 31, 32, and 33 compare the address with the higher-order 15 bits, 14 bits, and 13 bits of cache line addresses, and if valid data is present at any of matched addresses, send 2B (15:1) matching", "4B (15:2) matching", and "8B (15:3) matching" signals to control circuit 40, respectively. Cache control circuit 40 selects any of the lines in caches 20-23, which have the corresponding line size and with respect to which the matching signals have been sent back, so that data at the matched address will be replaced by the data "D5".

In FIG. 3, however, there is no identical address. Instead, valid data is present in 1-byte line cache 20 at the address "A03F" the higher-order 15 bits of which match those of address "A03E". Therefore, the tag circuit 30 sends the "1B (15:1) matching" signal to the control circuit 40 to indicate the matching of the higher-order 15 bits. Control circuit 40 selects 1-byte line cache 20 and data combining circuit 51 (1B-MUX). Combining circuit 51 (1B-MUX) combines 1-byte data "8E" at the address "A03E" with 1-byte data "C2" at the address "A03F" (as indicated by reference numeral 11 in FIG. 3).

The control circuit 40 handles the combined 2-byte data "8AC2" as new 2-byte write data to the address "A03E". The tag circuit 31 for 2-byte line cache compares the address of the new write data with addresses in the cache. In this case, the cache contains no address where the higher-order 15 bits match those of the address "A03E". Instead, in FIG. 3, there is 2-byte data at the address "A03C" the higher-order 14 bits of which match those of the address "A03E", so that the 2-byte line tag circuit 31 sends the "2B (15:2) matching" signal to control circuit 40 to indicate a match of the higher-order 14 bits. Then control circuit 40 selects the data combining circuit 52 (2B-MUX) for 2-byte line cache and combining circuit 52 (2B-MUX) combines the 2-byte write data "8AC2" with the data "B137" in the corresponding 2-byte line (as indicated by reference numeral 12 in FIG. 3).

Control circuit 40 handles the combined 4-byte data "B1 . . . C2" as new 4-byte write data starting at the address "A03C". Then tag circuit 32 for 4-byte line cache compares the address of the new write data with addresses in the cache. In FIG. 3, there is no 4-byte data at the address "A03C" where the higher-order 13 bits match those of the address "A03E". Therefore, cache control circuit 40 selects 4-byte line cache 22, and writes the combined data to the cache as data starting at the address "A03C". In the above-mentioned sequence of operations, the tag circuits for 1-byte line cache and 2-byte line cache perform comparisons concurrently rather than sequentially. If all the 4-byte cache lines are full, the control circuit 40 specifies a cache line using a predetermined cache updating procedure such as conventional LRU (Least Recently Used) algorithm. After that, the specified cache line is flushed if needed to write the data back to the system memory (so as to maintain data coherency). Control circuit 40 also invalidates the data "C2" in the 1-byte cache line and the data "B137" in the 2-byte cache line so that data to the same address will not be present in different cache lines.

Referring now to FIG. 6, the CPU core sends an instruction to control circuit 40 to read 8-byte data from address "93E8". Since the read data is 8-byte data, the 8-byte tag circuit 33 compares addresses. If valid data is present at a matched address, the data is sent to the CPU via combining circuit 50 for reading (read MUX). In the example shown in FIG. 6, however, there is no matched address, that is, there is no corresponding data. Control circuit 40 reads the 8-byte data of address "93E8" from system memory. At the same instant, each byte-line tag circuit compares the address with the higher-order 13 bits of each cache line address. If there is valid data at an address where the higher-order 13 bits match those of the address, each tag circuit sends a "1B (15:3) matching" signal to control circuit 40, which selects a data combining circuit for the byte line to which the matching signal is directed. The combining circuit replaces a corresponding byte(s) of data from the system memory by the data in the byte line. In FIG. 6, since there is the data "349B" at the matched address "93EA" of a 2-byte cache line, corresponding bytes of data are replaced by the data. Control circuit 40 then invalidates the data "349B" in the 2-byte cache line so that data to the same address will not be present in different cache lines. The partially replaced 8-byte data is written into an 8-byte cache line and sent to the CPU core via combining circuit (read MUX) 50.

The following description compares the present invention and a conventional cache system. The comparison is made assuming that a cache having a line size of 1, 2, 4, 8, 16, and 32 is used in conjunction with a 32-bit CPU capable of 1-byte to 4-byte write operations. It is also assumed that the size of read line is 32 bytes and the cache has four 1-byte to 16-byte lines respectively and 1 K lines for 32-byte reads. An executable application is configured to access the cache on a byte basis to write 1 M bytes to contiguous addresses. The cache is invalidated at the initial startup.

For a conventional memory architecture, when the cache has a fixed line size of 32 bytes, 32-byte data is loaded (cached) into a 32-byte cache line at the start of 32 one-byte writes. Subsequently, 32 writes are made between the CPU and the cache. This operation is repeated until the cache is full. Once the cache is full, a flush is performed concurrently in conjunction with each cache loading operation. If the processing speed of the CPU is sufficiently faster than the memory access, memory access time will be dominant after the cache becomes full. As a result, memory operation requires time for 32-byte read (loading) and 32-byte write in total every 32-byte write cycle. If the system memory is DRAM, it will require additional time such as pre-charge time and bank access time.

Conversely, for the cache architecture claimed herein, the first byte is written into a 1-byte cache line at the start of 32 one-byte writes. The second byte is combined with the first byte data, and written into a 2-byte cache line. The third byte is written into an empty 1-byte cache line. The fourth byte is combined with the just-written 2-byte line and 1-byte line, and written into a 4-byte cache line as four-byte data. Write operations are thus repeated. Then, upon the 32nd single-byte write, 32-byte data is written into a 32-byte cache line. If the cache is full, a 32-byte cache line is flushed to the system memory. In this case, if the processing speed of the CPU is sufficiently faster than the memory access, a 32-byte cache-flush is made only once a 32-byte write operation. Therefore, the disclosed cache structure and methodology saves operation time compared to the aforementioned conventional method, thereby achieving a doubling or more of processing speed. Without continuous write accesses, there is no need for a 32-byte caching associated with a single-byte write. In this case, the present invention also has the advantage of avoiding needless writes of the remaining 31 bytes solely for the purpose of the 1-byte write.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of writing data to a cache memory having a plurality of memory segments, each segment allocating a different number of bytes per word line for data storage comprising the steps of:

matching width of a first write data to a first memory segment having a correspondingly sized cache line data width;

storing the first write data at an address of the first memory segment having a correspondingly sized cache line data width; and wherein if the first write data is initially written to a memory address contiguous with a first valid data, concatenating the first write data with the first valid data and storing in a second memory segment having a cache line data width corresponding to the size of the concatenated first write data and first valid data when all memory segments corresponding to the size of a combined data to be written are occupied by valid data, such that the valid data is replaced with the write data when an address space contiguous with the valid data is not available and valid data is present in an address specified by the write data.

2. A method of writing data to a cache memory having memory segments, each segment allocating a different number of bytes per word line for data storage, comprising the steps of:

comparing a write address of a first write data with a plurality of addresses of cache lines having same size as the write data;

combining a first valid data with the first write data to form a combined data if an address space contiguous with the write address is available and the valid data is present in a first cache line specified by the address space contiguous with the write address;

writing the combined data, as data with the contiguous addresses, into a second cache line having same size as the combined data when all memory segments corresponding to the size of a combined data to be written are occupied by valid data, and replacing the valid data with the write data when an address space contiguous with the valid data is not available and valid data is present in an address specified by the write data.

3. The method according to claim 2, wherein said writing step further comprises:

comparing the address of the combined data with a plurality of addresses of cache lines having the same size as the combined data, and selecting a cache line having a matched address if there is any address matching the address of the combined data.

4. The method according to claim 2 further comprising the step of caching out the combined data from the second cache line and storing in a main memory.

5. The method according to claim 2 further comprising the step of invalidating the valid byte of data in the first cache line used to form the combined data.

6. A method of controlling a cache memory system having a plurality of cache lines ranging from 1 to $2^n$ bytes (where n is a positive integer), each of the cache lines having an M bit address (where M is a positive integer) and a data width of 1 to $2^n$ bytes, comprising the steps of:

(a) comparing a write address of a single byte write data word with a plurality of addresses of single byte cache lines;

(b) combining a single byte of valid data with the single byte write data word to form a 2-byte data word if the single byte valid data is stored in one of the plurality of single byte cache lines containing an address whose first higher-order (M−1) bits match those of the write address;

(c) comparing an address of the 2-byte data word with the addresses of a plurality of 2-byte cache lines;

(d) combining a 2-byte valid data with the 2-byte data word to form a 4-byte data word if the 2-byte valid data is stored in one of the plurality of 2-byte cache lines containing an address whose second higher-order (M−2) bits match those of the address of the 2-byte data word;

(e) after repeating said comparing step (c) and combining step (d) in sequence, if a $2^{(n-1)}$-byte valid data is stored in the plurality of $2^n$-byte cache lines containing an address whose nth higher-order (M−n) bits match those of an address of a $2^{(n-1)}$-byte data word, combining the $2^{(n-1)}$-byte valid data with the $2^{(n-1)}$-byte data word to form a $2^n$-byte data word; and (f) writing the $2^n$-byte data word into a $2^n$-byte cache line as data with an address contiguous with the write address, when all memory segments corresponding to the size of a combined data to be written are occupied by valid data and replacing the valid data with the write data when an address space contiguous with the valid data is not available and valid data is present in an address specified by the write data.

7. A method of controlling a cache memory system having a plurality of cache lines ranging from 1 to $2^n$-bytes (where n is a positive integer), each of the cache lines having an M bit address (where M is a positive integer) and a data width of 1 to $2^n$ bytes, comprising the steps of:

writing a $2^n$-byte write data into a $2^n$-byte cache line;

comparing a first high-order (M−n) bits of an address of the $2^n$-byte write data with a second high-order (M−n) bits of addresses of each of $2^n$-byte cache lines;

invalidating a valid data word stored in one of the $2^n$-byte cache lines containing an address whose second high-order (M−n) bits match the first high-order (M−n) bits of the $2^n$-byte write data when $2^{n-1}$-byte data block is combined with $2^n$-byte data block; and replacing the valid data with the write data when an address space contiguous with the valid data is not available and valid data is present in an address specified by the write data.

8. A method of controlling a cache memory system having a plurality of cache lines ranging from 1 to $2^n$ bytes (where n is a positive integer), each of the cache lines having an M bit address (where M is a positive integer) and a data width of 1 to $2^n$ bytes, comprising the steps of:

comparing a first high-order (M−n) bits of an address of a $2^n$-byte data cached from an external memory with a second high-order (M−n) bits of addresses of each of $2^n$-byte cache lines;

replacing a corresponding part of the cached $2^n$-byte data by a valid data word stored in one of the $2^n$-byte cache lines containing an address whose second high-order (M−n) bits match the first high-order (M−n) bits of the cached $2^n$-byte data; and invalidating the valid data word in the $2^n$-byte cache line when $2^{n-1}$-byte data block is combined with $2^n$-byte data block; and replacing the valid data with the write data when an address space contiguous with the valid data is not available and valid data is present in an address specified by the write data.

9. A cache memory system comprising:

a plurality of memory segments, each segment allocating a different number of bytes per word line for data storage;

tag circuits comparing a write address of a write data word with a plurality of addresses of said memory segments; and a control circuit writing data into a cache line having the same size as the write data word when there is no address contiguous with the write address, or combining the write data with a valid data at a contiguous address to form a combined data word and writing the combined data word as data with two contiguous addresses into a cache line having the same size as the combined data when there is an address contiguous with the write address, wherein if there is no address contiguous with the write address and valid data is present in a cache line having the address which matches the address of the write data, said control circuit replaces the valid data by the write data.

10. The system according to claim 9 wherein said control circuit invalidates the valid data in a cache line used for forming the combined data.

11. The system according to claim 9 further comprising circuits for combining the write data with data stored in a contiguous address.

12. The system according to claim 9 wherein said tag circuits are provided for the respective sizes of said cache lines.

13. A microprocessor unit (MPU) including a central processing unit (CPU) core and a cache memory connected to the CPU core via a bus, said cache memory comprising:

a plurality of memory segments, each segment allocating a different number of bytes per word line for data storage;

tag circuits comparing a write address of a first write data with a plurality of addresses of said plurality of memory segments; and a control circuit writing the write data into a cache line having the same size as the write data when there is no address contiguous with the write address, or combining the write data with valid data at a contiguous address to form a combined data and writing the combined data as data with two contiguous addresses into a cache line of one of the plurality of memory segments having the same size as the combined data when there is an address contiguous with the write address, wherein if there is no address contiguous with the write address and valid data is present in a cache line having the address which matches the address of the write data, said control circuit replaces the valid data with the write data.

14. A cache memory system having a plurality of cache lines ranging from one byte to $2^n$ bytes (where n is a positive integer), each of which contains an M bit address (where M is a positive integer) and have a data width of 1 to $2^n$ bytes, comprising:

tag circuits comparing a first high-order (M−n) bits of an address of a $2^n$-byte write data with a second high-order (M−n) bits of addresses of each of $2^n$-byte cache lines; and a control circuit writing the $2^n$-byte write data into the $2^n$-byte cache line and invalidating a valid data if there is valid data in a one of each of the $2^n$-byte cache lines containing an address whose second high order (M−n) bits match the first high-order (M−n) bits of the $2^n$-byte write data when $2^{n-1}$-byte data block is combined with $2^n$-byte data block, wherein if there is no address contiguous with the write address and valid data is present in a cache line having the address which matches the address of the write data, said control circuit replaces the valid data by the write data.

15. A cache memory system having a plurality of cache lines ranging from one byte to $2^n$ bytes (where n is a positive integer), each of which contains an M bit address (where M is a positive integer) and have a data width of 1 to $2^n$ bytes, comprising:

tag circuits comparing a first high-order (M−n) bits of an address of a $2^n$-byte data cached from an external memory with a second high-order (M−n) bits of addresses of each of $2^n$-byte cache lines; and a control circuit, which replaces a corresponding part of the cached $2^n$-byte data by a valid data and invalidates the valid data in the $2^n$-byte cache line after being used for replacement when the valid data is stored in one of the $2^n$-byte cache lines containing an address whose second high-order (M−n) bits match the first high-order (M−n) bits of the cashed $2^n$-byte data when the $2^{n-1}$-byte data block is combined with the $2^n$-byte data block, wherein if there is no address contiguous with the write address and valid data is present in a cache line having the address which matches the address of the write data, said control circuit replaces the valid data by the write data.

* * * * *